3,829,332
WATERPROOF BATTERY CASE
Toru Iizuka and Katsuo Tonooka, Ashikaga, Torahiko Saitoh, Tokyo, and Isao Yasuda, Ashikaga, Japan, assignors to Kohkoku Chemical Industry Co., Ltd., Tokyo, Japan
Filed June 20, 1972, Ser. No. 264,437
Claims priority, application Japan, July 6, 1971, 46/58,868
Int. Cl. H01m 1/06
U.S. Cl. 136—173
4 Claims

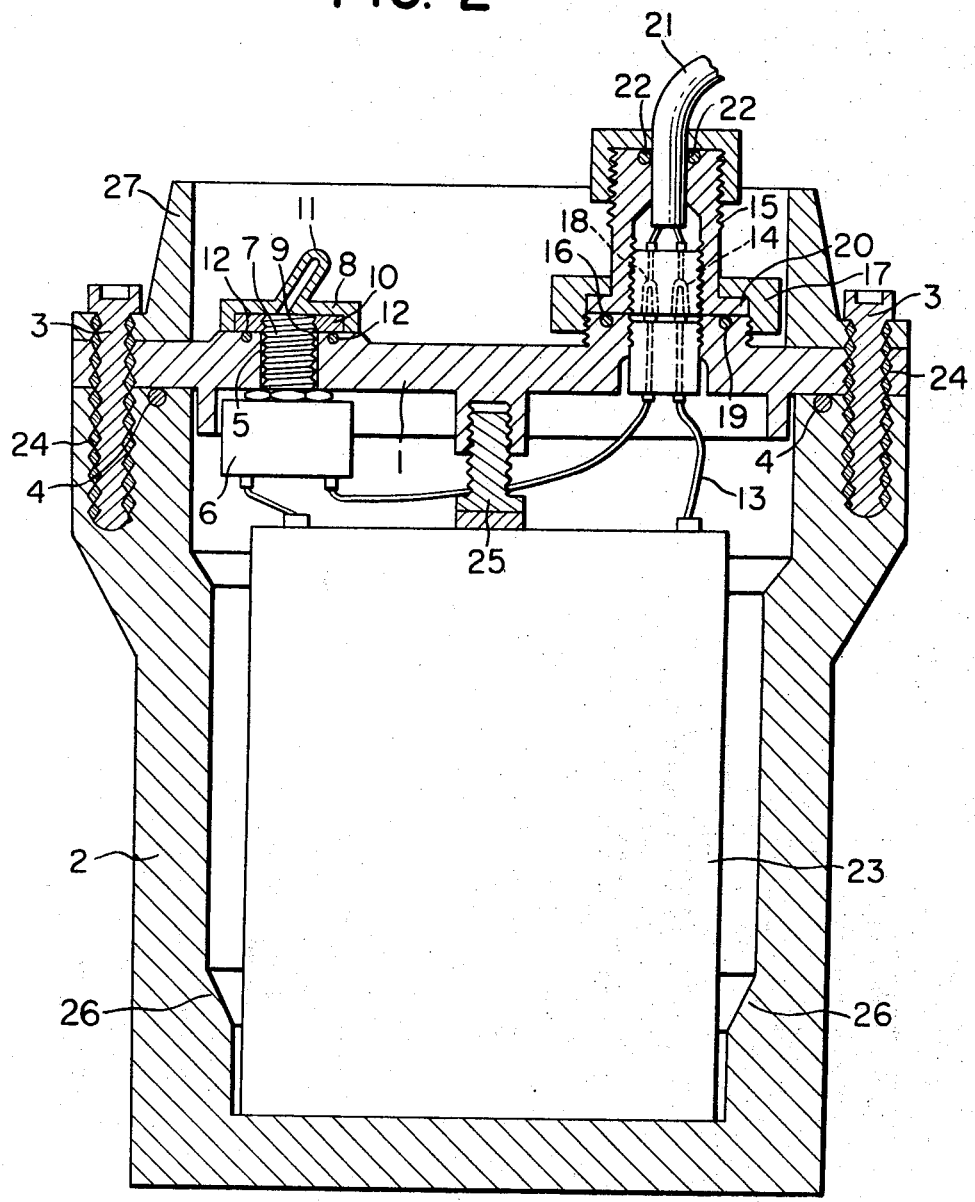

ABSTRACT OF THE DISCLOSURE

A waterproof battery case, comprising a waterproof switch part and a waterproof cord connector part.

---

Figure 1:
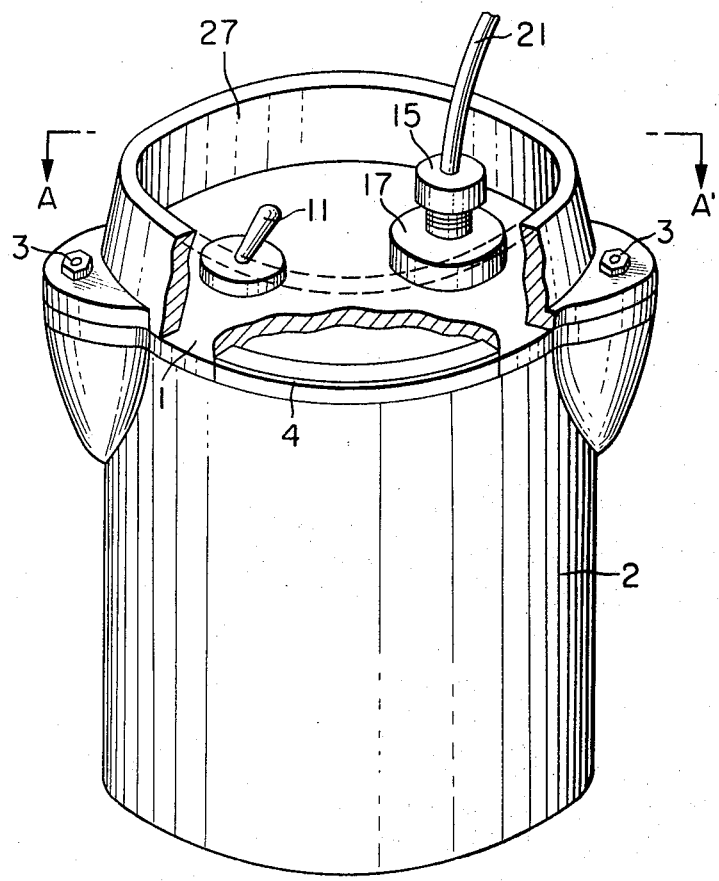

The present invention relates to a waterproof battery case, having a waterproof switch part and a waterproof cord connector part and aims at that when a battery or a dry cell is applied to an electric source for electric appliances, used under water or in the rain, the electric source can be kept in a complete waterproof condition. For the above-mentioned electric appliances, used under water or in the rain, many examples can be enumerated, for example an underwater searchlight, a submersible driving motor or electric heaters, set in a wet suit or a rain shoe, etc.

An embodiment article of the present invention shall be explained referring to the drawing.

FIG. 1 is a perspective view, partly in section, of an embodiment article according to the present invention and FIG. 2, an enlarged sectional view, taken along the line A-A' of FIG. 1.

A battery case consists of a cover part (1) and a cylindrical case part (2). Both the cover part (1) and the case part (2) are made of ingot aluminium and soaked all over with synthetic resins to be constructed completely in a water-proof condition. The cover part (1) and the cylindrical case part (2) are firmly held in a water-tight condition by being jointed together with a suitable binder (3), for example, by being screwed together with a screw. Moreover, the case part (2) is fixed with a rubber ring-shaped sealing member (4). When the cover part (1) is jointed with the case part (2), the gap between the cover part (1) and the case part (2) is hermetically sealed by said sealing member (4), whereby the battery case is further held in a water-tight condition. The male screw part (7) of a switch (6) is inserted through from inside to a hole (5), made on the cover part (1). The male screw part (7), protruding from this hole (5), is screwed with a waterproof seat plate (8). Thus, the waterproof switch part is constructed. The waterproof seat plate (8) consists of a seat plate part (10), having a female screw (9), and a water-proof film (11) of such as rubber, covering the seat plate part completely from above. The waterproof seat plate (8) is screwed to the male screw part (7) of the switch (6), whereby the ring-shaped sealing member (12), fixed to the upper face of the case part (1) around the hole (5), is held between the lower surface of the seat plate part (10) and the upper surface of the cover part (1) to seal the gap between the waterproof seat plate (8) and the cover part (1). Further, the cover part (1) is attached with a waterproof cord connector part. In the water-proof cord connector part, a lead wire (13) of the electric source, contained in the case part (2), is connected with a terminal (14), fixed to the surface of the cover part (1) in a condition, insulated electrically from the cover part (1). The waterproof cord connector part consists of the terminal (14) and a connector (15), connected detachably with the terminal (14). The connection of said terminal (14) and said connector (15) is performed by that cylindrical male screw member (16), set around said terminal (14), is screwed together with a female screw member (17) of the connector (15), so that the terminal (18) of the connector (15) is made contacted with the terminal (14), attached to the cover part (1). By this screw connection, the gap between the seat plate (20) of the connector (15) and the male screw member (16) is sealed with the rubber ring-shaped sealing member (19) on the upper end of the male screw member (16) to be kept in a water-tight condition. For a lead wire (21), extending outwards from the terminal (18) of the connector (15), there is used a cabtire cord, having the outer surface coated with a waterproof synthetic resin film. This lead wire (21) is in a water-tight condition led out of the connector (15) through such as a rubber ring-shaped sealing member (22). The other end of the lead wire (21) is connected with an electric appliance, used under water or in the rain, or an interconnecting cord connector for the same. The lead wire (13) inside the case part (2) is led out of the electric source, such as a battery or a dry cell (23), and is connected in series with the switch (6) and the terminal (14) of the cord connector.

In case of a screw, such as made of stainless steel, being used for the binder (3), which makes the cover part (1) and the case part (2) jointed together to be a battery case, if the female screw of the case part (2) to be screwed with said screw is made of aluminium like the main body of the case part (2), a kind of cell is composed of stainless steel, aluminium and impure water at the screwed portion and the screw is so rusted as unable to be detached.

Therefore, according to the present invention, a stainless steel female screw member (24), made of the same metal as that of said screw, is put on the surface of the female screw of the case part (2), to be screwed with said screw, whereby, such a kind of cell as above-mentioned, is not composed at the screwed portion, so that the screw can be prevented from rust.

If for example a colloidal cell is used for a battery to be contained in a battery case in accordance with the present invention, it is quite favorable that there is no leakage of solution and no generation of such as hydrogen gas.

A holding element (25) of the cell (23) may be attached to the middle or other part of the inside of the cover part (1), or corresponding to the width of the cell, a projection (26) may be made on the lower circumference inside the case part (2). Thus, the cell (23) can be firmly placed inside the case part (2).

When the battery (23), contained in the battery case according to the present invention, is charged with electricity, the battery may be of course taken out to be connected directly with a charger, but in another method, the charger may be connected with the connector (15), composing the cord connector part, used in the battery case in accordance with the present invention. Then, the switch (6) of the battery case is turned on to charge the contained battery (23).

According to the present invention, such as corrosion resisting metals or synthetic resins, having excellent strength may favorably used for the material of the battery case. However, it is required to be waterproof.

A cylindrical protector (27) is attached to the circumferential upper face of the cover part (1), so that the switch part and the cord connector part, protruding above the upper face of the cover part (1) can be protected from shocks. The protector (27) may be connected with the cover part (1) and also, the case part (2) by means of the binder (3), which joints the cover part (1) and the case part (2) together.

The battery case in accordance with the present invention is provided as above-mentioned with a waterproof switch part and a waterproof cord connector part, so that an electric source can be protected from water when an electric appliance is used under water or in the rain. This battery case can be made small-sized because the waterproof switch part, the waterproof cord connector part and the cell are collected in one body. Accordingly, it can be easily carried. For example, it can be freely done to swim under water with an electric heater being passed with electricity. And also, the battery case can be applied to an electric source for a portable electric appliance, such as a waterproof electric torch, used under water or in the rain. In this case, such as light alloys are used for the material of the battery case in order to make handy to carry, so that the battry case becomes favorably lightweighted. The battery case according to the present invention can resist a large hydraulic pressure because it is made of waterproof metals and synthetic resins, having great strength.

What is claimed is:

1. Waterproof battery case for electrical appliances adaptable for underwater use comprising a cover member and a case member both made of waterproof ingot light metal, a coating of synthetic resin material completely covering each of said cover member and case member, binder means attaching said cover member and said case member together, said members being so constructed as to be bound together in a watertight condition by said binder means, a rubber ring-type sealer extending between said cover member and said case member completely along the joint formed therebetween by said binder means, a waterproof switch member and a waterproof cord connector member provided in said cover member, and a tubular protector member provided on the outer face of said cover member for said waterproof switch member and said waterproof cord connector member as a protective covering therefor, said protector member being bound to said cover and case members by said binder means.

2. A battery case, according to claim 1, including a battery holder set on the interior of said battery case to support therein a battery to be contained within said case.

3. A battery case, according to claim 1, including a colloidal cell contained within the interior thereof operaitve to perform as a power source.

4. A battery case, according to claim 1, wherein said binder means comprise a female screw member and a male screw member, said female screw member being formed of the same material as said male screw member, with said female screw member being affixed to said battery case and adapted to receive said male screw member therein.

References Cited

UNITED STATES PATENTS

| | | | |
|---|---|---|---|
| 2,948,806 | 8/1960 | Anderson | 240—10.66 |
| 3,208,884 | 9/1965 | Jensen | 136—168 |
| 2,729,740 | 1/1956 | Davis | 240—10.66 |

DONALD L. WALTON, Primary Examiner

U.S. Cl. X.R.

240—10.66